(12) United States Patent
Pan et al.

(10) Patent No.: US 7,137,187 B2
(45) Date of Patent: Nov. 21, 2006

(54) INTEGRATED LEAD SUSPENSION FOR HIGH DENSITY DRIVE

(75) Inventors: Tzong-Shii S. Pan, San Jose, CA (US); Surya Pattanaik, San Jose, CA (US)

(73) Assignee: Hitachi Global Storage Technologies, The Netherlands B.V., Amsterdam (NL)

( * ) Notice: Subject to any disclaimer, the term of this patent is extended or adjusted under 35 U.S.C. 154(b) by 261 days.

(21) Appl. No.: 10/611,080

(22) Filed: Jun. 30, 2003

(65) Prior Publication Data

US 2004/0027725 A1 Feb. 12, 2004

Related U.S. Application Data

(62) Division of application No. 09/676,216, filed on Sep. 28, 2000, now Pat. No. 6,965,501.

(51) Int. Cl.
G11B 5/48 (2006.01)
G11B 21/16 (2006.01)
H05K 3/10 (2006.01)

(52) U.S. Cl. .............. 29/603.03; 29/603.04; 29/603.05; 29/846; 29/840

(58) Field of Classification Search ............ 29/603.03, 29/603.04, 603.05, 846, 831, 840, 860; 360/245.3, 360/245.4, 245.5, 245.6, 245.7, 246.1, 246.4, 360/244, 244.9, 245.9, 255
See application file for complete search history.

(56) References Cited

U.S. PATENT DOCUMENTS

| 5,982,584 | A | * | 11/1999 | Bennin et al. | ........... 360/245.9 |
| 6,151,197 | A | * | 11/2000 | Larson et al. | ............... 360/255 |
| 6,424,498 | B1 | * | 7/2002 | Patterson et al. | ........ 360/245.7 |

FOREIGN PATENT DOCUMENTS

JP 10-55636 * 2/1998

* cited by examiner

*Primary Examiner*—A. Dexter Tugbang
(74) *Attorney, Agent, or Firm*—Liu & Liu

(57) ABSTRACT

A method producing a limiter and flexure configuration that includes a flexure that has a first section attached to the load beam, and a second section defining a slider mounting section and a frame that defines an aperture into which the slide mounting section extends in a direction towards the first section, and terminating in an end that interacts with the free end of the limiter. The aperture is sized and positioned to provide a clearance allowing the limiter to freely move through the aperture such that the limiter is free to be bent from the first position to the second position and to extend through the aperture after the flexure assembly has been attached to the load beam. The limiter is bent from the first position to the second position, extending through the aperture, after the flexure assembly has been attached to the load beam.

20 Claims, 10 Drawing Sheets

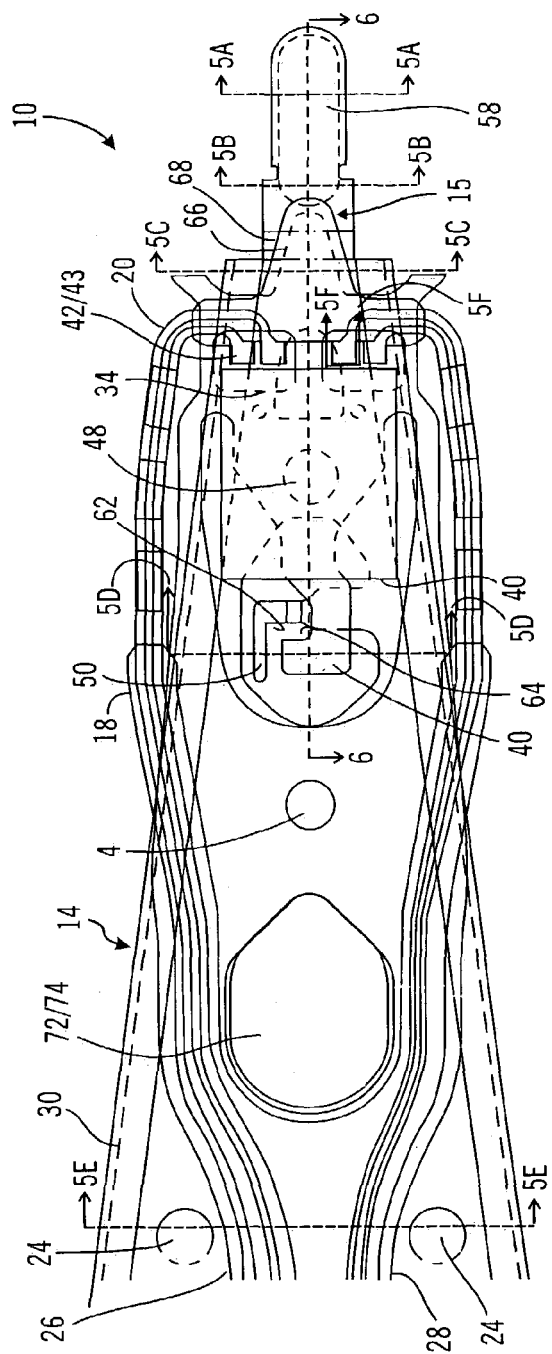
FIG. 4
FIG. 5A
FIG. 5B
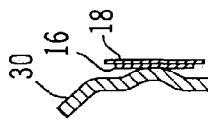
FIG. 5C
FIG. 5F
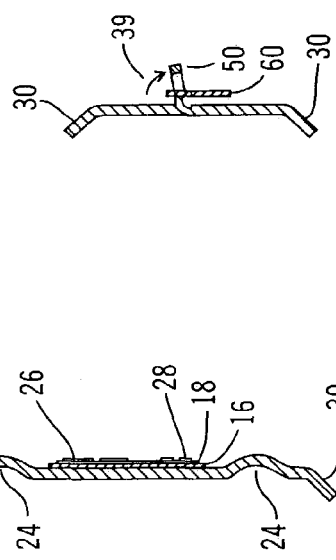
FIG. 5D
FIG. 5E

INTEGRATED LEAD SUSPENSION FOR HIGH DENSITY DRIVE

This is a Divisional of U.S. patent application Ser. No. 09/676,216, filed Sep. 28, 2000 now U.S. Pat. No. 6,965,501.

BACKGROUND OF THE INVENTION

1. Field of the Invention

This invention relates generally to magnetic disk storage systems, and more particularly, to a head suspension assembly for use in a magnetic disk storage system.

2. Description of Related Art

Magnetic disk drives are information storage devices that utilize at least one rotatable magnetic media disk having concentric data tracks defined for storing data, a magnetic recording head or transducer for reading data from and/or writing data to the various data tracks, a slider for supporting the transducer in proximity to the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and for maintaining the transducer over the data track center line during a read or a write operation. The magnetic media disk or disks in the disk drive are mounted to a spindle. The spindle is attached to a spindle motor, which rotates the spindle and the disks to provide read/write access to the various portions on the concentric tracks on the disks.

One type of suspension is an integrated lead suspension assembly that includes a load beam, a flexure, and a mount plate. The flexure assembly is supported at its forward portion on a gimbal for allowing gimballing of the slider/magnetic head combination, and mounts at its rearward portion to the load beam. The actuator shifts the load beam generally radially across the disk to carry the head to all desired portions of the disk. The main function of a load beam is to suspend the flexure along with a slider/magnetic head assembly at a desired position and at the same time apply pre-load to the head assembly. The pre-load is typically exerted by the rearward spring area portion of the load beam. The flexure assembly may include an integrated assembly of a layer of flexible metal, and electrical traces separated from the metal layer by an insulation layer.

The prior art integrated lead suspension assembly has a number of drawbacks. Prior art shows different methods of bonding of the electrical leads to the slider on the flexure assembly. Ultrasonic bonding methods involve clamping on the slider through the load beam, which requires a wider load beam tip to facilitate a clamping means (e.g., see U.S. Pat. No. 5,892,637). However, the external excitation acting upon the wide load beam results in torsional (off track) and in-plane bending modes that are at lower resonance frequencies during operation of the disk drive, which are undesirable as they affect the dynamic performance of the drive. Other clamping approach permits narrower load beam tip, but such load beam structures exclude a lift tab for interacting with a ramp for head loading and unloading (e.g., see U.S. Pat. No. 6,021,022).

Prior art integrated lead suspensions include a limiter for limiting the separation of the flexure from the load beam during unload operation of the slider from the disk. However, because of the relative location of the slider and the limiter, the limiter in prior art is known to slide away from the load beam during high shock in the unloaded position. The limiter location also causes higher force to pull the slider off the disk.

Prior art also requires prebending of the limiter on the load beam before attachment of the flexure to the load beam. The steps required for this structure create difficulties in manufacturing.

It is desirable to design an integrated lead suspension assembly that overcomes the above-mentioned drawbacks.

SUMMARY OF THE INVENTION

The integrated lead suspension assembly design of the present invention overcomes many of the drawbacks in the prior art. In accordance with one aspect of the present invention, a solder ball bonding technique is applied to bond the electrical traces to a slider. A novel configuration of the terminating pads for the electrical traces and the adjacent insulation layer on the flexure assembly facilitates laser solder ball bonding of the pads to the read/write terminal contacts on the slider. The pads are oversized with respect to the insulation layer to prevent damage to the insulating layer during laser bonding process. Laser solder ball bonding process does not require clamping of the components through the tip region of the load beam. Consequently, the tip of the load beam can be made narrow while providing a structure permitting head loading and unloading functions, which improves the dynamic performance of the suspension assembly.

In a further aspect of the present invention, the limiter is configured and positioned to minimize the possibility of disengagement of the limiter and the flexure assembly during unloading of the slider from the disk or under high shock environment. In accordance with one embodiment of the present invention, the limiter is located on the leading edge side of the slider. Due to the dynamics of this configuration, there is a tendency for the flexure assembly to flex towards the load beam limiter hook, thus keeping the flexure assembly against the load beam and from disengaging from the load beam.

In accordance with another aspect of the present invention, the flexure assembly is configured such that it requires no permanent bending (as opposed to flexing) in its forming process, and any permanent bending required is done to the load beam. This improves better tolerance control in view of the flat structure. This also simplifies processing, since the flexure assembly comprises thinner and more delicate components of traces, insulation and backing layer, which are more difficult to be accurately bent and handled. In another aspect of the present invention, the limiter that limits the travel of the flexure assembly is formed on the load beam and it is bent to the functional position only after attachment of the flexure assembly to the load beam.

Other improvements in accordance with the present invention include providing asymmetric steel backing branches for the read and write traces in the flexure assembly located at the hinge area of the load beam. To improve the flexibility at the hinge area, a cutout is provided to remove the section of the backing, which does not support traces. The widths of the branches of the backing adjacent the cutout are sized to optimize the dynamic signal performance of the read and write traces.

Low profile flanges are provided along the edges of the load beam to optimize bending stiffness and flow induced vibration. In accordance with one embodiment of the present invention, a 30°–60° bend from the plane of the load beam would provide improved dynamic characteristics. Dimples may be provided along the load beam to facilitate insertion of a plastic head separation tool.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

FIG. 4 is an enlarged top view of the suspension assembly tip region with all of its component layers: the stainless steel load beam and the three flexure layers (stainless steel trace, polyimide insulation, copper trace/conductor lead).

FIGS. 5A–5F are sectional views along different sections of the suspension assembly as shown in FIG. 4.

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the invention.

Figure 10:
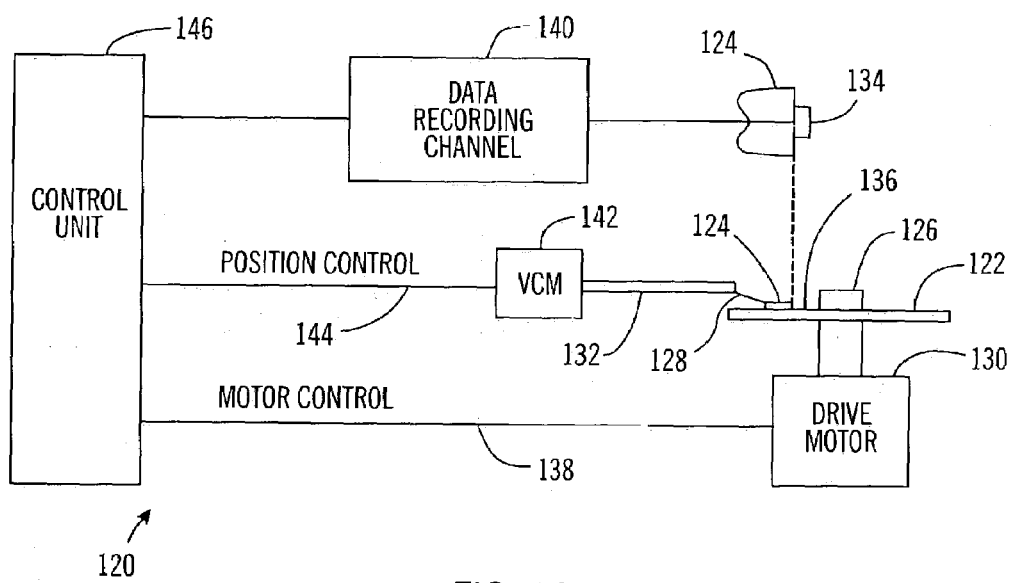
FIG. 10 is a simplified drawing of a magnetic recording disk drive system.

Referring now to FIG. 10, there is shown a disk drive 120 embodying the suspension of the present invention. As shown in FIG. 10, at least one rotatable magnetic disk 122 is supported on a spindle 126 and rotated by a disk drive motor 130. The magnetic recording media on each disk is in the form of an annular pattern of concentric data tracks (not shown) on the disk 122.

At least one slider 124 is positioned on the disk 122, each slider 124 supporting one or more magnetic read/write heads 134. As the disks rotate, the slider 124 is moved radially in and out over the disk surface 136 so that the heads 134 may access different portions of the disk where desired data is recorded. Each slider 124 is attached to a positioner arm 132 by means of a suspension 128 to form a head gimbal assembly. The suspension 128 provides a slight spring force, which biases the slider 124 against the disk surface 136. Each positioner arm 132 is attached to an actuator 142.

During operation of the disk storage system, the rotation of the disk 122 generates an air bearing between the slider 124 and the disk surface 136 which exerts an upward force or lift on the force of the suspension 128 and supports the slider 124 off and slightly above the disk surface by a small, substantially constant spacing during normal operation.

The various components of the disk storage system are controlled in operation by control signals generated by a control unit 146, such as access control signals and internal clock signals. Typically, the control unit 146 comprises logic control circuits, storage chips and a microprocessor. The control unit 146 generates control signals to control various system operations such as drive motor control signals on line 138 and head position and seek control signals on line 144. The control signals on line 144 provide the desired current profiles to optimally move and position the slider 124 to the desired data track on the disk 122. Read and write signals are communicated to and from the read/write heads 134 by means of a recording channel 140.

The above description of a typical magnetic disk storage system, and the accompanying illustration of FIG. 10 are for representation purposes only. It should be apparent that disk storage systems may contain a large number of disks and actuators, and each actuator may support a number of sliders.

Figure 11:
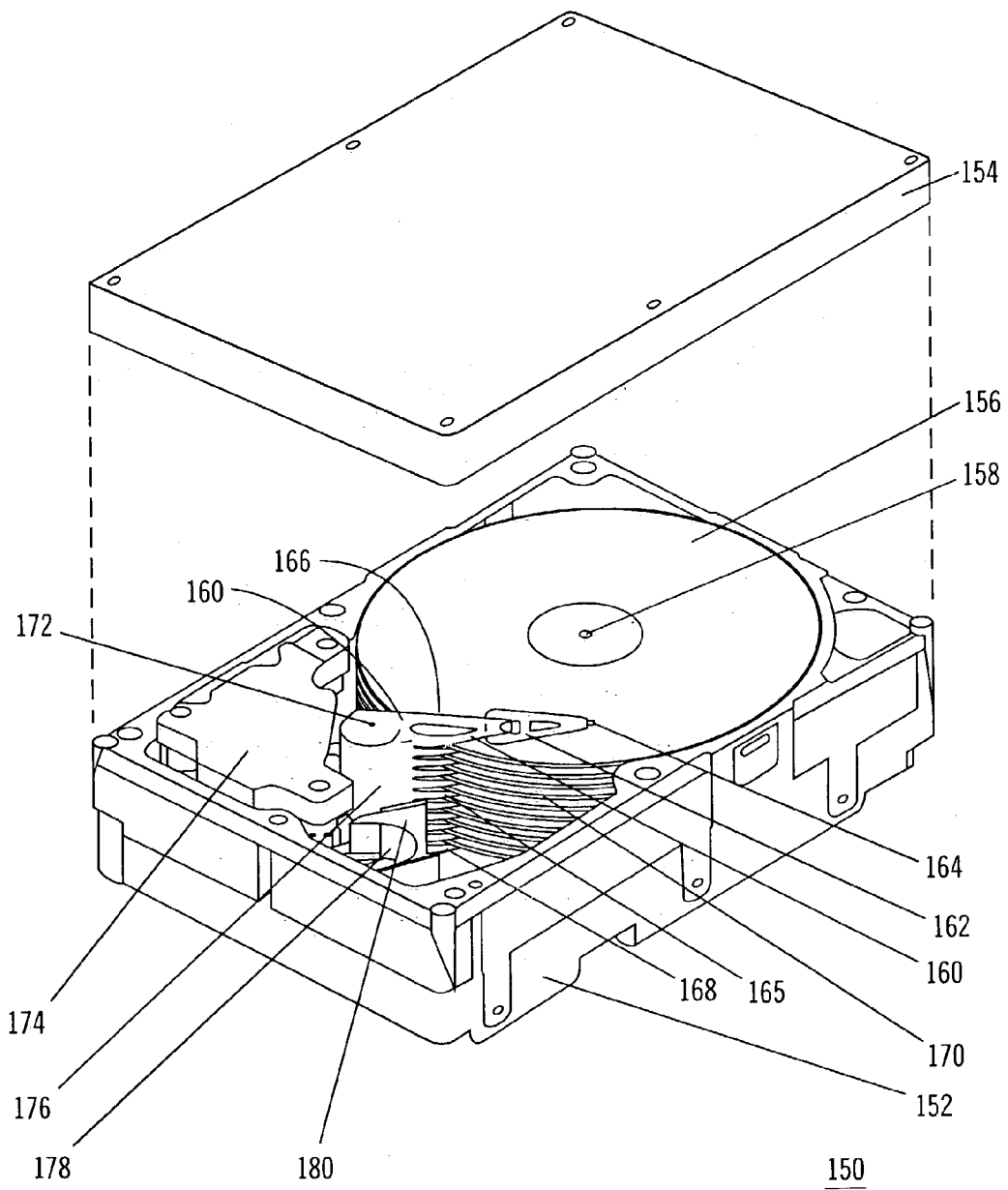
FIG. 11 is a perspective view of a disk drive.

FIG. 11 shows a hard disk drive 150 using the suspension of the present invention. The cover 154 of the disk drive is shown exploded. In operation, the cover would be disposed on top of the housing 152. The disk drive 150 comprises one or more magnetic disks 156. The disks may be conventional particulate or thin film recording disks, which are capable of storing digital data in concentric tracks. In a preferred embodiment, both sides of the disks 156 are available for storage, and it will be recognized by one of ordinary skill in the art that the disk drive 150 may include any number of such disks 156.

The disks 156 are mounted to a spindle 158. The spindle 158 is attached to a spindle motor (not shown), which rotates the spindle 158 and the disks 156 to provide read/write access to the various portions of the concentric tracks on the disks 156.

An actuator assembly 176 includes positioner arm 160, and a suspension assembly 162. The suspension assembly 162 includes a slider/transducer assembly 164 at its distal end. Although only one slider/transducer assembly 164 of the suspension assembly 162 is shown, it will be recognized that the disk drive 150 has one slider/transducer assembly 164 for each side of each disk 156 included in the disk drive 150. The actuator assembly 176 further comprises a pivot 172 around which the actuator 176 with positioner arm 160 pivots.

The main function of the actuator assembly 176 is to move the positioner arm 160 around the pivot 172. Part of the actuator assembly 176 is the voice coil motor (VCM) assembly 174, which comprises a VCM bottom plate, one or more magnets, and a VCM top plate in combination with an actuator coil. Current passing through the actuator coil interacts with the magnetic field of the magnets to rotate the positioner arm 160 and suspension assembly 162 around the pivot 172, thus positioning the slider/transducer assembly 164 as desired.

Most disk drives 150 have a number of disks 156 mounted on the spindle 158 to form a disk stack 170. The actuator assembly 176 comprises a plurality of positioner arms 160 fixed in a comb-like arrangement such that the inner arms 165 fit between the disks 156 forming disk stack 170 and the outer arms 166, 168 extend over the top surface of the top disk and the bottom surface of the bottom disk, respectively. The inner arms 165 each support two suspension assemblies 162 (upper and lower suspension assemblies) with attached slider/transducer assemblies 164. The upper outer arm 166 supports one suspension assembly 162 with its slider/transducer assembly 164 to access data on the top surface of the top disk of disk stack 170. The lower outer arm 168 supports one suspension assembly 162 with its slider/transducer assembly 164 to access data on the bottom surface of the bottom disk of disk stack 170.

Figure 1:
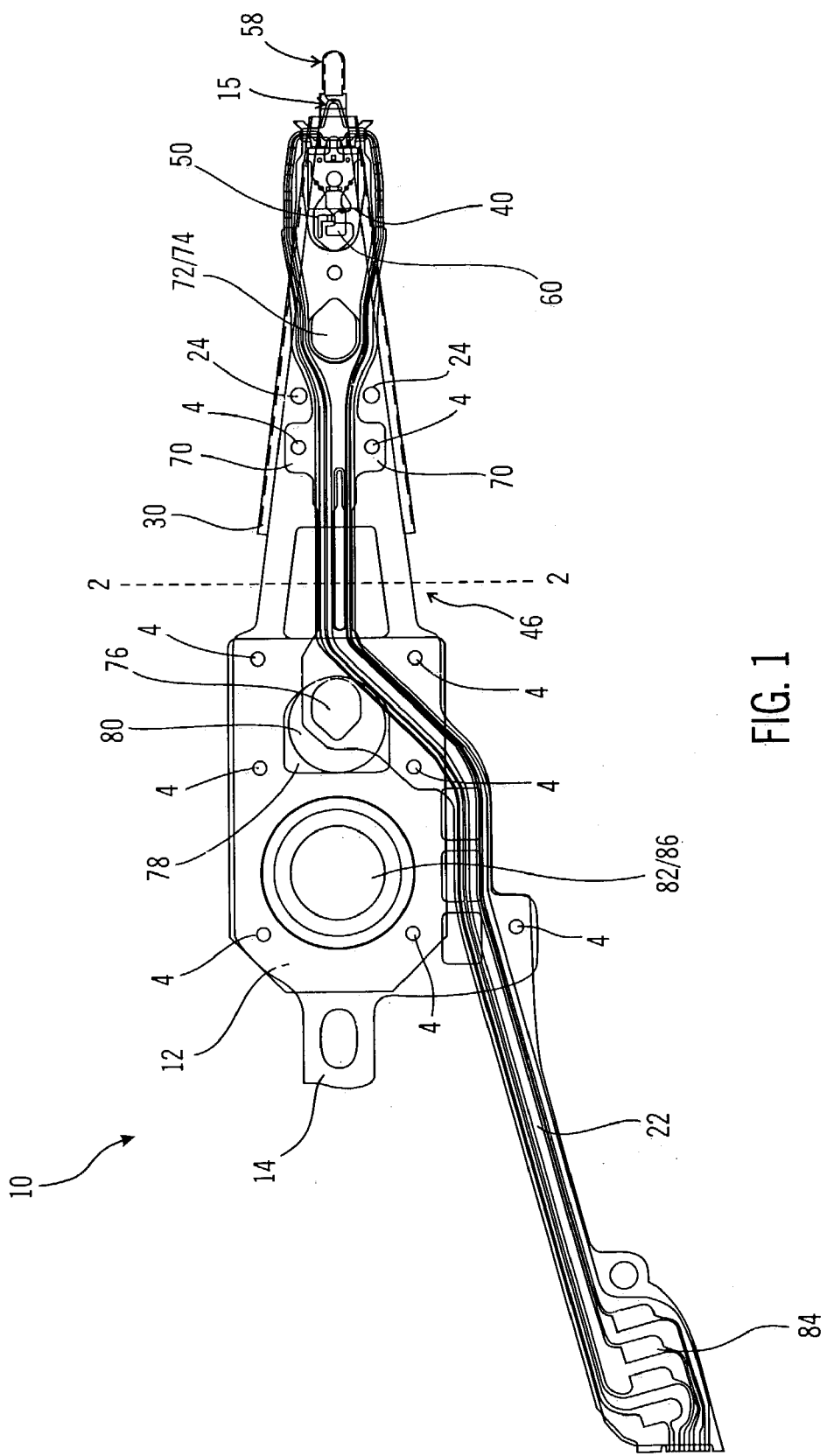
FIG. 1 is a top view of the suspension assembly with side views of the flanges.
Figure 2:
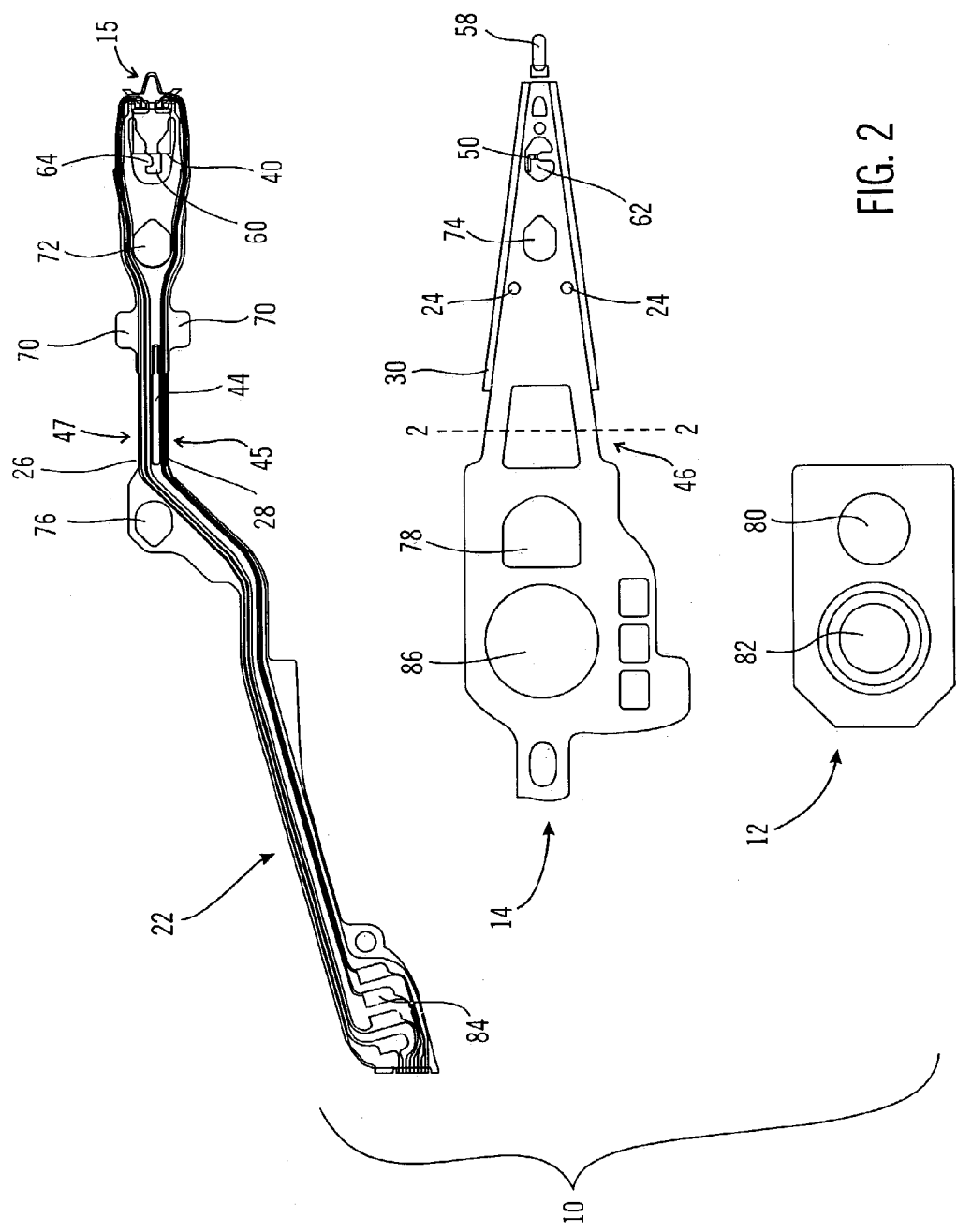
FIG. 2 is an exploded top view of the suspension assembly, which includes the flexure assembly, the stainless steel load beam, and the mount plate.

FIG. 1 shows a top view of a suspension assembly 10 according to one embodiment of the present invention for use in the disk drive in FIG. 11. FIG. 2 shows an exploded top view of the suspension assembly 10, which includes a flexure assembly 22, a stainless steel load beam 14, and a mount plate 12, attached to each other in that order. The suspension assembly carries at its forward portion a gimballing structure comprising the interaction of the load beam and the flexure and slider/magnetic head combination, and mounts at its rearward portion to the actuator (not shown). The suspension assembly 10 supports a slider 40 near a limiter 50 and a hook 60. A head lift 58 extends from the tip region 15 of the suspension assembly 10.

Along the suspension assembly 10 are various openings in the load beam 14, flexure 22, and mount plate 12, which overlap when the components are stacked. These openings not only act as guides for placement, but also efficiently reduce the overall mass of the suspension assembly 10. In FIG. 2, the flexure rear opening 76, the load beam mid opening 78, and the plate opening 80 are lined up as the suspension assembly 10 components are stacked. In addition, the flexure front opening 72 and the load beam front opening 74 are lined up. Swaging hole 82 is shown overlapping over load beam hole 86.

Figure 3:
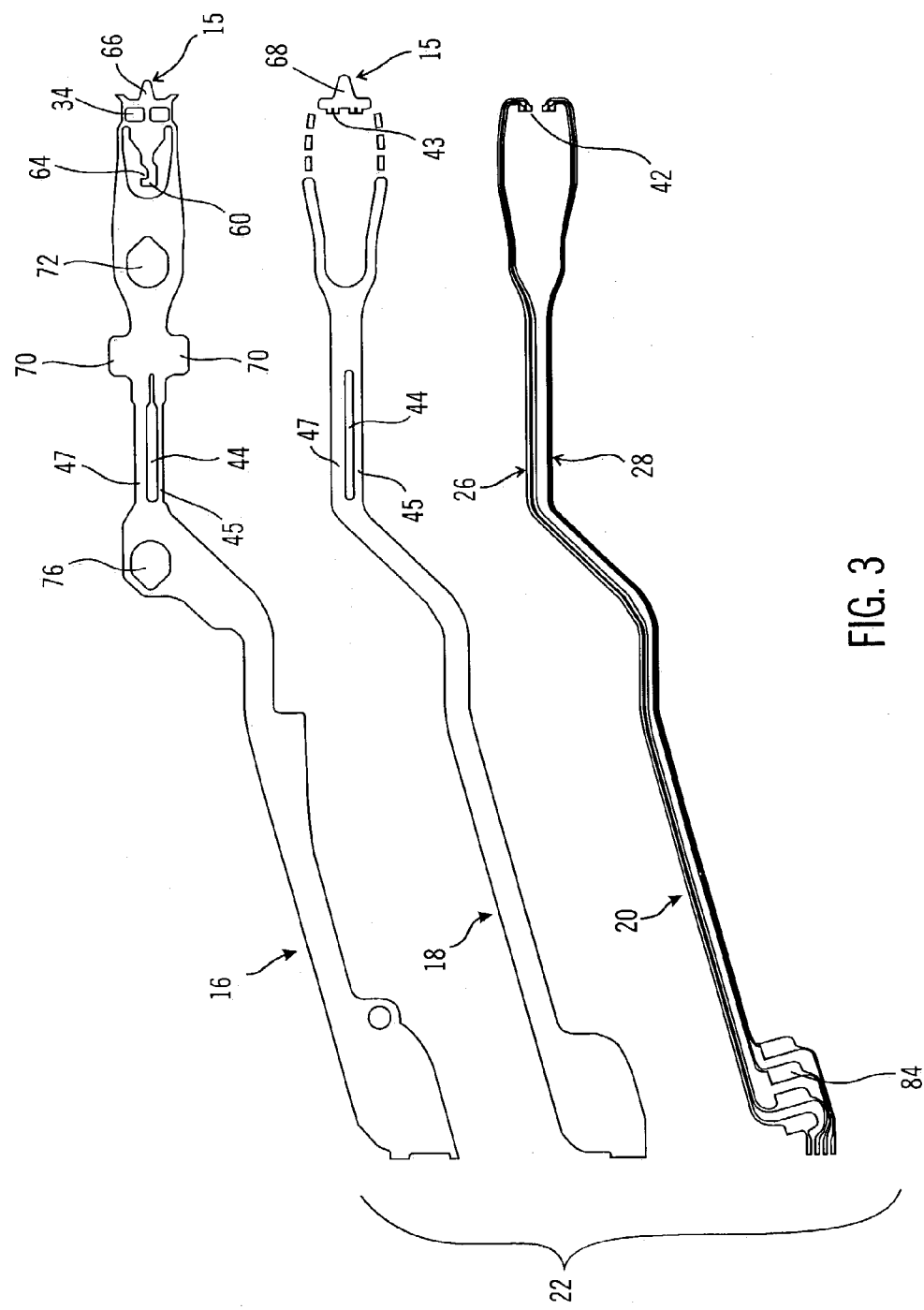
FIG. 3 is an exploded view of the flexure assembly of the suspension as shown in FIG. 1, including a stainless steel backing layer, a polyimide insulation layer, and a copper trace/conductor lead layer.

FIG. 3 is an exploded view of the flexure assembly 22 of the suspension assembly 10, as shown in FIG. 1. The flexure assembly 22 comprises electrical traces 20, a polyimide insulation 18, and a stainless steel backing 16, attached to each other in that order. To join the parts of the suspension assembly 10, the welding points 4 are used. As can be seen in FIG. 1, the welding points 4 are placed so that welding only occurs with the stainless steel backing 16 of the suspension assembly 10, avoiding the polyimide insulation 18 and traces 20. The welding points 4 at wings 70 on the steel backing 16 join the flexure assembly 22 to the load beam 14. The flexure assembly 22 has read traces 26 and write traces 28, one end of which terminating at the connector 84 at the rearward portion of the suspension assembly 10, and another end terminating at the pads 42 near the slider 40. The traces provide electrical connections between the read/write heads on the slider and the control system (shown in FIG. 10).

Referring also to FIG. 2, for better mechanical and electrical performance, the flexure assembly 22 splits into branches 45 and 47 of unequal width at the cutout 44 at the hinge region (line 2—2) of the suspension assembly 10. At this region, the flexure assembly 22 has a symmetric boundary for mechanical balance, but it has the asymmetric branches 45 and 47 for improved electrical characteristics of the traces 26 and 28 according to data signal response requirements. The asymmetric cutouts 44 accommodate different widths of read trace 26 and write trace 28 (see also FIG. 5E), which are fully backed with stainless steel backing 16 for uniform impedance requirement of high data rate and better structural integrity of the traces as they are subject to flexing during operation. To accommodate the different requirements of the read and write signals, the read traces 26 are wider than the write traces 28, thus requiring a wider branch 47 along the flexure assembly 22.

Figure 6:
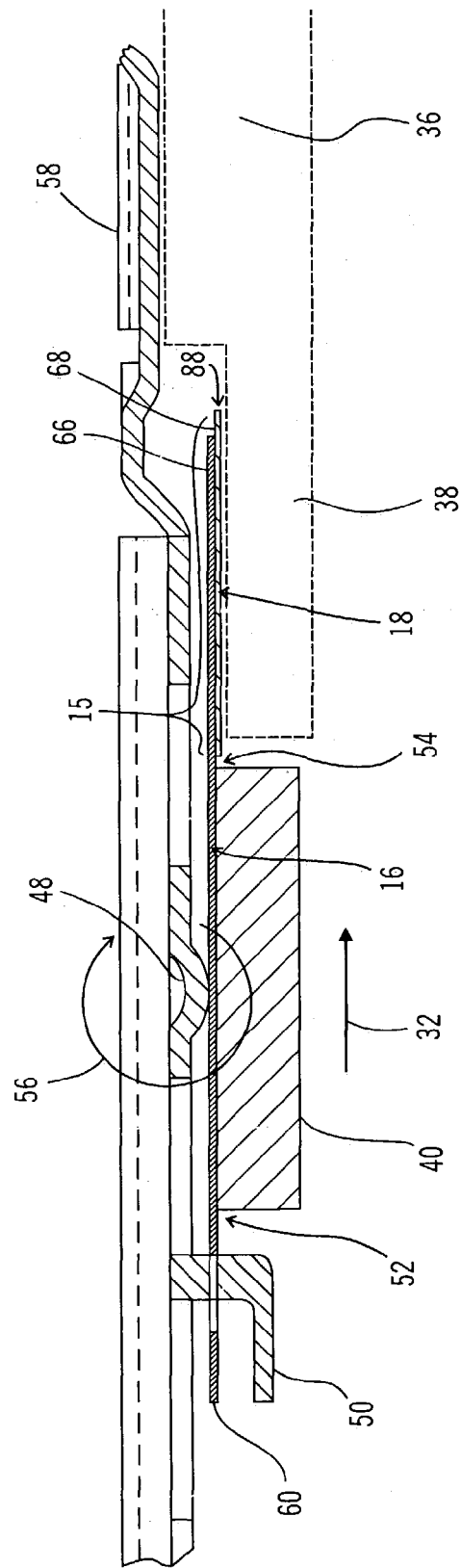
FIG. 6 is an enlarged side view of the suspension assembly tip region as shown in FIG. 1.

FIGS. 1 and 2 show that the load beam 14 is pre-bent to define a hinge 46 along line 2—2, which allows bending of the load beam at the hinge during loading and unloading of the slider 40 with respect to the disk. Bending at hinge 46 is in a direction away from the mount plate 12 and towards the flexure assembly 22, so as to provide a preload spring force on the slider when it is loaded onto the disk. FIG. 6 shows an enlarged side view of the suspension assembly tip region 15. In this view, a disk (not shown) rotates below the slider 40 in the direction of the arrow 32, as an air bearing exists between the disk and the slider 40. The hinge 46 allows the load beam 14 to bias the slider 40 towards the surface of the disk during operating conditions.

To further provide a biasing force, a dimple 48 on the load beam 14 is used. Since the dimple 48 protrudes toward the flexure assembly 22, thus towards the slider 40 and the surface of the disk (not shown), the load beam 14 biases the slider 40 to the disk. The air bearing, or the cushion on which the slider 40 sits, provides a counterforce to maintain the suspension assembly 10 at the proper distance from the disk. The pivoting feature of the dimple 48 also provides flexibility in the flexure assembly 22 so that it can adapt to variations in disk surfaces as well as in different disk operating conditions.

FIGS. 5A–5E show sectional views of the suspension assembly 10 as shown in FIG. 4. The edges of the load beam 14 are bent, which forms flange 30, to improve the rigidity of the generally flat load beam 14. In accordance with another aspect of the present invention, the flange 30 of the load beam 14 is set at an angle between 30°–60° to the plane of the load beam (e.g., 45°), which would allow an acceptable compromise between high bending stiffness and low flow-induced vibration. The lower profile of the load beam 14 results in less excitation caused by air turbulence, which maintains adequate stiffness of the load beam 14.

Figure 7:
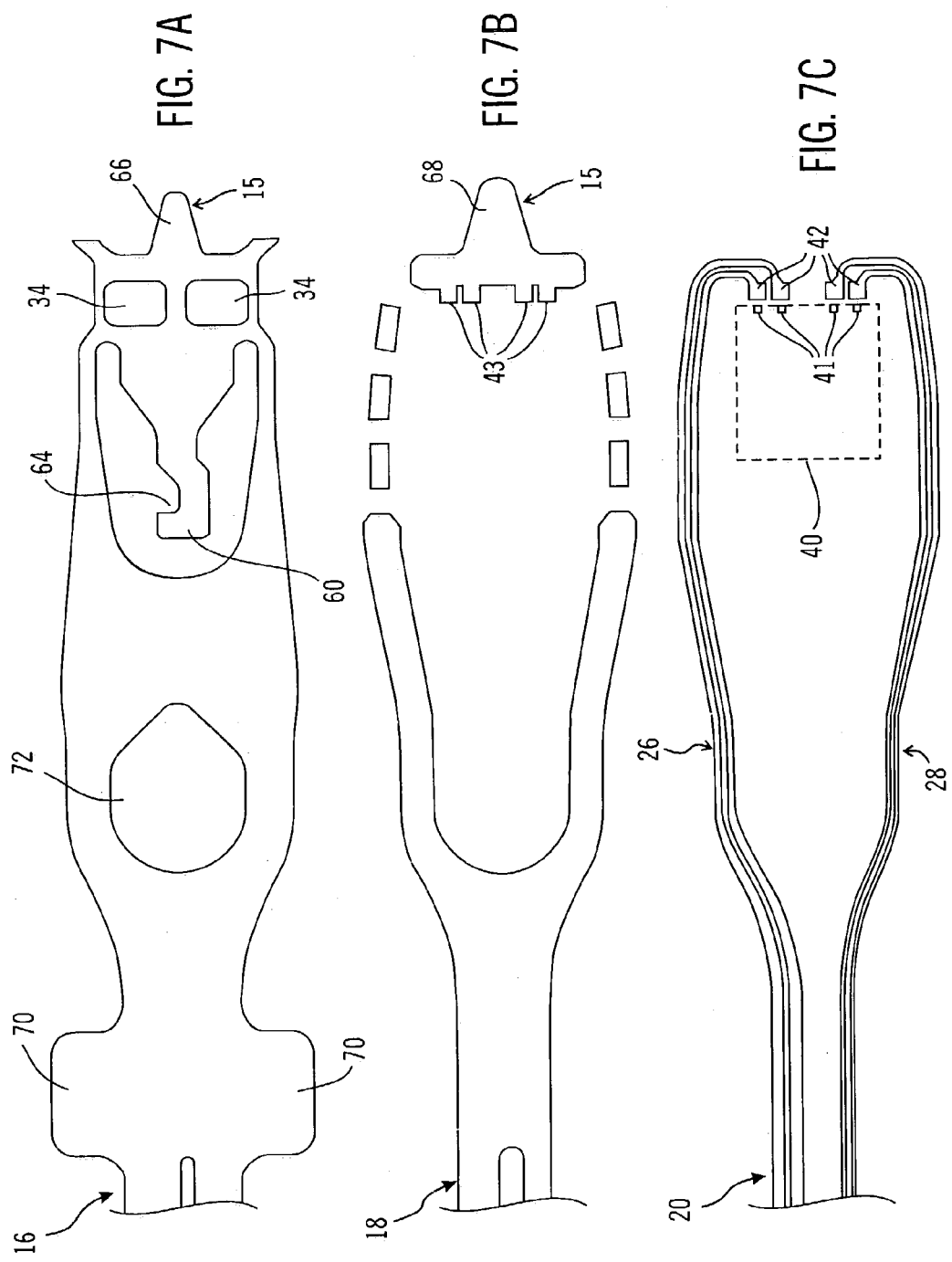
FIGS. 7A–C are enlarged views of the exploded parts of the flexure assembly tip region as shown in FIG. 3.

FIG. 5F shows the sectional view of the suspension assembly 10 at the terminating pads 42. This sectional view, taken along line 5F—5F in FIG. 4, shows that the size of the copper pad 42 is slightly bigger than that of the insulating pad 43 such that the copper pad 42 extends over the insulating pad 43 on the side of the slider 40. In accordance with one aspect of the present invention, laser solder ball bonding may be applied to join the contacts of the read/write heads on the side of the slider 40 to the copper pads 42. FIG. 7C shows the relative placement of the slider 40, the read/write contacts 41, and the copper pads 42. When a laser is used to reflow a solder ball to connect the slider read/write contact pads 42 to the copper pad 42, the oversized copper pads 42 prevent the edges of the polyimide insulation pads 43 underneath them from burning, which may also lead to damage to the entire insulation pads and the insulation under the neighboring traces. When the electrical traces 20, insulation 18, and steel backing 16 are stacked, the copper pads 42 and the polyimide insulation pads 43 are suspended over the opening 34 without the support of the stainless steel backing 16. This configuration prevents potential electrical shorting by the steel backing 16 in the event the insulation pads 43 are defective.

Prior art uses ultrasonic bonding operations to bond the pads to the slider. This typically requires clamping of the slider support and the terminating leads of the traces through the load beam opening. Since laser solder ball bonding techniques are used with the present invention, no clamping of the components is required during the bonding process. Without such clamping, the present invention overcomes the drawback associated with the requirements for clamping the slider through load beam window (see U.S. Pat. No. 5,892, 637) or exposed flexure tongue (see U.S. Pat. No. 6,021, 022). In accordance with the present invention, the load beam tip can be made narrow for a suspension without compromising the structure for the load/unload function (see discussion below). Referring to FIG. 4., it can be seen that the width of the tip section of the load beam below the slider 40 is about the same or less than the width of the slider 40. For prior art narrow load beam applications, the load beam does not extend beyond the slider to provide a lift tab to permit head loading and unloading functions. For prior art wide load beam tip applications (the width of the load beam being significantly larger than the width of the slider) that have head loading and unloading functions, the external excitation acting upon the wide load beam results in torsional (off track) and in-plane bending modes that have lower resonance frequencies during operation of the disk drive, which are undesirable as they affect the dynamic performance of the drive. Thus, the narrow load beam 14 is designed for improved dynamic performance by pushing the resonance modes to higher frequencies while providing head loading and unloading functions.

Figure 8:
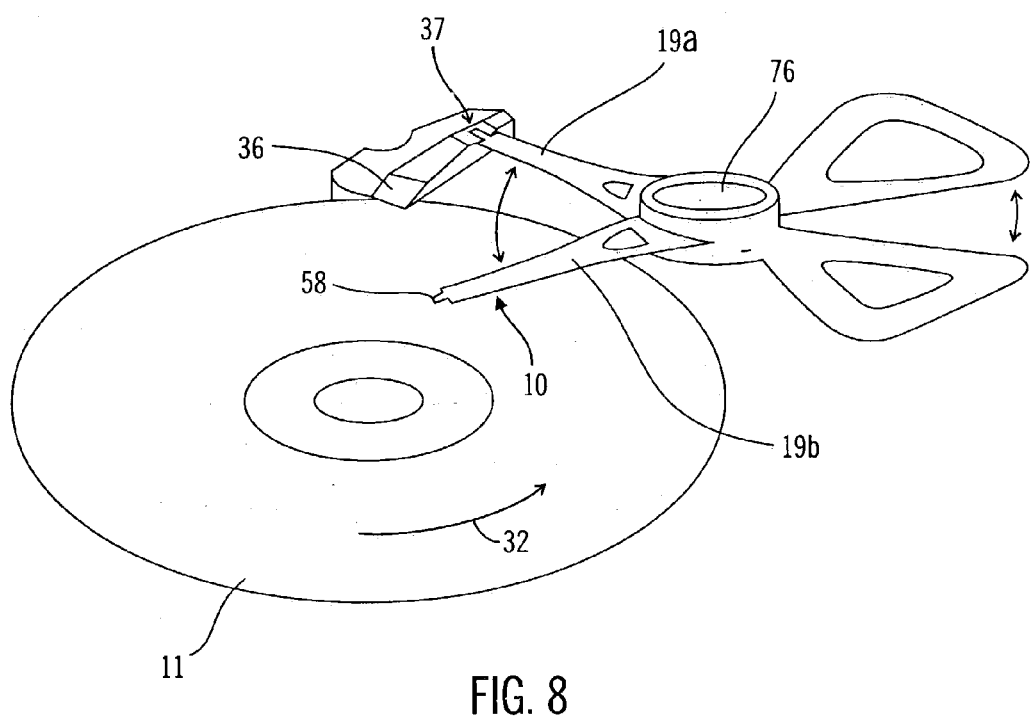
FIG. 8 is a perspective view illustrating loading and unloading of the slider/suspension assembly with respect to the disk.
Figure 9:
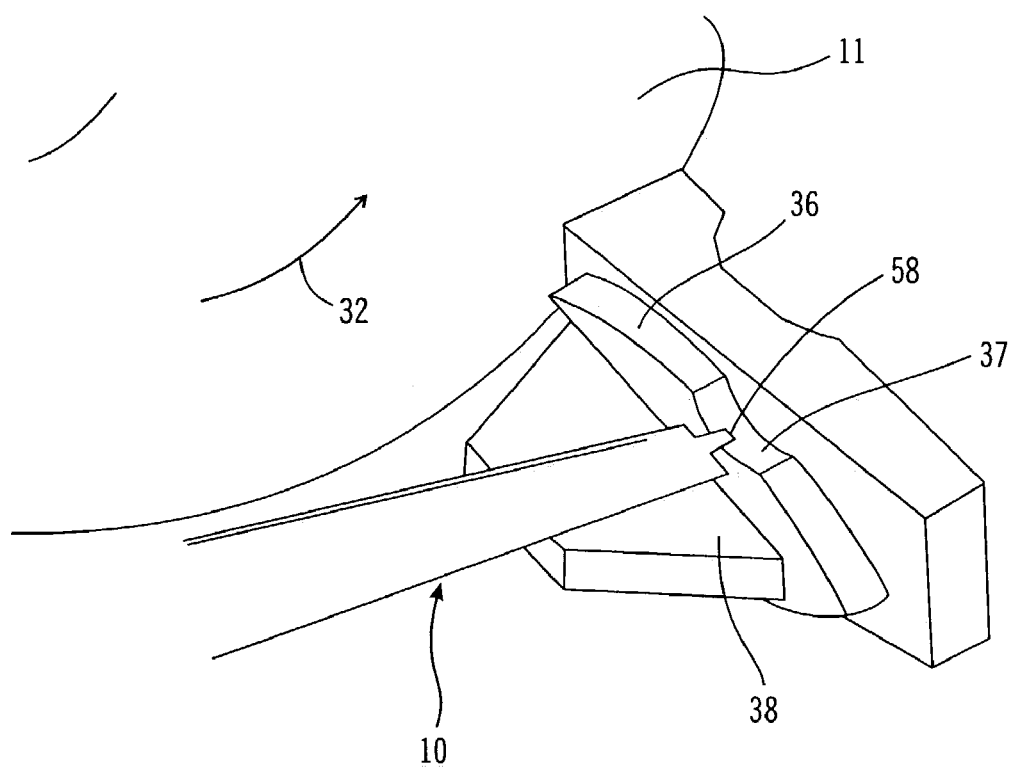
FIG. 9 is a perspective view of the load/unload ramp dynamics.

At the forward position of each suspension assembly 10 is a "lift tab," or a head lift 58. FIG. 8 shows a simplified view of the movement of the suspension assembly 10 between "load" and "unload" positions with respect to a disk 11 in the disk drive 150 (shown in FIG. 11). A ramp mechanism 36 is employed to lift the heads from each disk surface as the suspension assembly that supports the read/write head travels beyond the disk's perimeter, where the heads are "parked" outside of the disk stack. The actuator 76 is shown to move the suspension assembly 10 to access the disk surface at the "load" position 19b and to rest at a parked position 19a. The sectional view of the head lift 58 is shown in FIG. 5A, taken along line 5A—5A in FIG. 4. As seen in FIGS. 8 and 9, when the actuator 76 moves to the unloaded (or parked) position 19a from the loaded position 19b, the head lift 58 slides over the ramp 36 that extends over the disk surface. The curved shape of the head lift 58 and the ramp 36 cooperate to create a cam action to lift the load beam and the flexure assembly attached thereto (including the slider 40). After moving along the ramp 36, the head lift 58 rests at a detent 37, where the heads are in the parked position. During head loading, the actuator 76 is turned to move the suspension assembly 10 towards the disk, such that the slider is lowered and supported on the air bearing formed on the rotating disk surface 11 as the head lift 58 is guided down the ramp 36. To prevent harmful disk surface contact during loading, descent speed of the slider is controlled by controlling the movement of the actuator.

To further aid in parking the heads, a novel suspension tip configuration is used, as shown in FIGS. 2, 4, and 6. FIG. 4 is an enlarged top view of a suspension assembly tip region, which includes a flexure tip 15. At the parked position, the tip 15 rests above a stop 38 with a small gap 88. Thus the flexure assembly 22 and the slider 40 are prevented from large movement from the load beam 14 during high non-operational shock. The stop 38 is made of plastic, and it may be part of or an extension from the ramp 36. FIGS. 2 and 4 are top views of the layers of the stainless steel backing 16 and polyimide insulation 18. In accordance with one embodiment of the present invention, FIG. 6, which is an enlarged side view of the suspension assembly tip region, shows that the polyimide insulation tip 68 extends beyond the stainless steel backing tip 66 (see also FIG. 4). FIG. 5C, which is the section taken along line 5C—5C in FIG. 4, is another view that shows the steel backing 16 with the extended polyimide insulation 18. During non-operational shock, the flexure insulation tip 68 protects the stop 38 from abrasion by the stainless steel backing tip 66 since only the extended insulation tip 68 contacts the supporting stop 38. Otherwise, the steel backing tip 66 could cut or scrape the plastic stop 38, causing plastic dust particles that could contaminate the disk drive operating environment, leading to head read/write failure.

While FIG. 6 shows only one suspension assembly 10, ramp 36, and stop 38, it is noted that additional components can be stacked to complement a stack of disks in a disk drive assembly. The ramps 36 and stops 38 may be configured in a generally comb shaped configuration, with each "prong" of the "comb" functionally cooperating with the adjacent surfaces of two adjacent disks.

FIG. 6 shows the relative orientation of the slider 40 and the flexure assembly 22 to a limiter 50. The limiter 50 extends generally perpendicularly from the plane of the load beam 14. Its purpose is for limiting the extent by which the flexure assembly 22 can move away from the load beam 14. Otherwise, the flexure assembly 22 may be damaged when the separation of the flexure assembly 22 from the load beam 14 exceeds its design limit. By interacting with the hook 60 on the flexure assembly 22, the limiter 50 on the load beam 14 initially lifts the flexure hook 60 of flexure tongue 16 (which supports the slider 40) during head loading and unloading operations against the air bearing suction on the slider 40. As seen in FIG. 6, the limiter 50 is located at the leading edge 52 side of the slider 40 (the direction of disk rotation is indicated by the arrow 32). The limiter 50 engages with the hook 60 of the stainless steel backing 16 in the flexure assembly 22. The top view in FIG. 4 shows the placement required for the limiter 50 and hook 60 during assembly of the flexure assembly 22 to the load beam 14 for proper engagement of the hook 60 and the limiter 50. In this view, the limiter 50 is shown in its initial configuration as it is formed flat in the plane of the load beam 14. The inner curve 62 of the unbent limiter 50 fits with the inner curve 64 of the hook 60. FIG. 5D, a sectional view taken along line 5D-5D in FIG. 4, shows the engagement of the limiter 50 to the hook 60 of the stainless steel backing 16, but in this view the limiter 50 is bent from its initial position to a position perpendicular to the plane of the load beam 14 (arrow 39). With the limiter configuration as shown, the flexure assembly 22 and the load beam 14 are formed without having to bend to form a vertical limiter extending from the structures. All components are kept generally flat (see FIG. 4) until the last step of manufacturing, in which bending of the limiter 50 is undertaken to position the limiter 50 in a functional manner with respect to the hook 60. Prior art limiters had to be bent prior to assembling the flexure assembly to the load beam.

The configuration and positioning of the limiter 50, as described above, also minimizes the possibility of disengagement of the limiter 50 and the hook 60 when the disk drive is subject to high shock. Prior art limiter configuration and placement are less secure in the engagement of the flexure assembly 22 when subject to high shock. The present invention's placement of the limiter 50 improves the functional integrity of the limiter. As seen in FIG. 6, the limiter 50 is located at the leading edge 52 side of the slider 40. The tip of the limiter 50 points away from the slider 40. During loading and unloading and the parked position, the dynamics of the air bearing suction causes a positive pitch 56 about the dimple 48 and the slider 40 separated from the dimple 48. With the limiter 50 positioned at the leading edge 52 side of the slider 40, the positive pitch 56 and the separation between the dimple 48 and the slider 40 tend to cause the flexure hook 60 to move towards the load beam limiter 50. The limiter 50 catches against the hook 60 and reduces the likelihood of the limiter 50 disengaging from the hook 60 of the flexure tongue 16 of the flexure assembly 22. Consequently, the slider 40 and the flexure assembly 22 are less likely to separate from the load beam 14 beyond their design limit.

During manufacturing of an actuator assembly 76 comprising a stack of suspension assemblies, the suspension assemblies should be maintained separated in a manner that maintains clearance between adjacent sliders. The sliders/heads of two opposite facing adjacent suspension assemblies face each other. A plastic head separation tool in the shape of a comb has been used in the past to separate the suspension assemblies to prevent damage to the air bearing surface of the slider 40. The finger of the comb shaped tool is inserted between two opposite facing adjacent suspension assemblies. In accordance with another aspect of the present invention, to facilitate insertion of the head separation tool, dimples 24 are provided on the load beam 14. FIG. 5E shows two dimples 24, which are aligned transversely relative to the load beam longitudinal axis. The sectional view in FIG. 5E shows wider read trace 26 and narrower write trace 28 that run between the two dimples 24, which protrude on the side of the traces 26 and 28. The dimples 24 serve as cam surfaces for head separation tool insertion between adjacent facing suspension assemblies, and prevent damage to the traces. Given that the head separation tool is made of a plastic material that could otherwise be chipped by the sharp edges of the stainless steel layer 16 of the flexure assembly, the dimples 24 reduce the abrasion against the tool. This in turn reduces stray dust arising from abrasion, which would be damaging to the operation of the disk drive. Although one dimple would suffice for facilitating insertion of the head separation tool, the use of two dimples 24 provides symmetry to allow tool insertion from either side of the load beam 14.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A method of making an integrated lead suspension assembly for supporting a slider in a magnetic storage system, comprising:
   providing a load beam, the load beam having a longitudinal, generally flat structure including a limiter section having an extended free end;
   providing a flexure assembly comprising a longitudinal, generally flat flexible member and conductive leads formed thereon;
   fixedly attaching a first section of the flexible member to the load beam;
   defining at a second section of the flexible member, a slider mounting section for supporting a slider and a frame that defines an aperture that is sized and positioned with respect to the limiter section to provide a clearance allowing the limiter section to freely move trough the aperture such that the limiter section is free to be bent from a first position to a second position and to extend through the aperture after the flexure assembly has been attached to the load beam; and
   after attaching the first section of the flexible member to the load beam, bending the limiter section to form a limiter, from a first position in which the free end of the limiter section is substantially in a plane of the load beam, to the second position in which the free end is substantially out of the plane of the load beam,
   wherein the slider mounting section extends into the aperture in a direction towards the first section, terminating in an end that interacts with the limiter.

2. The method of claim 1, wherein the free end of the limiter extends towards the first section of the flexible member.

3. The method of claim 2, wherein the aperture is located in the second section of the flexible member at a leading edge side of a slider to be placed into operation.

4. The method of claim 3, wherein the end of the slider mounting section defines a stop that interacts with the limiter in the second position such that movement of the flexible member away from the load beam is limited by catching the limiter by the stop.

5. The method of claim 4, wherein the stop comprises a hook member defined in the aperture, positioned and sized to catch the limiter in the second position.

6. The method of claim 2, further comprising a pivot effecting gimbal motion of the slider mounting section with respect to the load beam, wherein the aperture in the flexible member is between the pivot and the first section of the flexible member.

7. The method of claim 2, wherein the aperture is located in the second section of the flexible member between the first section and the slider mounting section.

8. The method of claim 1, wherein the conductive leads terminate in terminal pads at one end adjacent the slider mounting section such that the terminal pads can be connected to terminals on a slider supported on the slider mounting section, wherein the terminal pads are not supported by the flexible member.

9. The method of claim 8, wherein the flexible member defines openings adjacent the slider mounting section, wherein the terminal pads are located above the openings.

10. The method of claim 9, wherein the flexure assembly further comprises an insulation layer between the conductive leads and the flexible member; wherein the insulation layer extends below the terminal pads but covering an area smaller than the terminal pads.

11. The method of claim 10, wherein the terminal pads are sized and positioned to allow solder ball bonding of the terminal pads to the terminals on the slider.

12. The method of claim 1, wherein the load beam further comprises a tab extending from a distal end of the load beam beyond the slider mounting section, the tab having a curve surface for interacting with an external cam surface for slider loading and unloading with respect to a parked position.

13. The method of claim 12, wherein the second section of the flexible member extends over a tip region of the load beam, wherein the tip region is substantially same or narrower than the slider mounting section.

14. The method of claim 1, wherein the load beam comprises at least a dimple protrusion near an edge of the load beam, on a same side as the flexure assembly and at a location where the load beam is not attached to or facing the flexible member, the dimple protrusion having a height taller than the flexure assembly, whereby the dimple protrusion facilitates insertion of a tool to maintain separation of an adjacent similar integrated lead suspension assembly.

15. The method of claim 14, wherein the load beam comprises two dimple protrusions, each near an edge of the load beam, on either side of a section of the flexure assembly.

16. The method of claim 1, wherein:
the load beam is pre-bent to define a hinge region,
the conductive leads includes read leads for read data and write leads for write data to and from the slider, and
the first section of the flexible member has a split section above the hinge region, supporting read leads on a first branch and write leads on a second branch of a different width.

17. The method of claim 16, wherein the read leads are wider than the write leads and the first branch is wider than the second branch.

18. The method of claim 17, wherein the overall perimeter of the spilt section is generally symmetrical with respect to a longitudinal axis.

19. A method of making an integrated lead suspension assembly for supporting a slider in a magnetic storage system, comprising:
providing a load beam, the load beam having a longitudinal, generally flat structure;
providing a flexure assembly comprising a longitudinal, generally flat flexible member and conductive leads formed thereon;
fixedly attaching a first section of the flexible member to the load beam;
defining at a second section of the flexible member, a slider mounting section for supporting a slider and a frame that defines an aperture located between the first section and the slider mounting section; and
forming a limiter having a free end extending out of the plane of the load beam, through the aperture in the flexible member and towards the first section,
wherein the slider mounting section extends into the aperture in a direction towards the first section, terminating in an end that interacts with the limiter.

20. A method of making an integrated lead suspension assembly for supporting a slider in a magnetic storage system, comprising:
providing a load beam, the load beam having a longitudinal, generally flat structure; and
providing a flexure assembly comprising a longitudinal, generally flat flexible member and conductive leads formed thereon;
fixedly attaching a first section of the flexible member to the load beam;
defining at a second section of the flexible member, a slider mounting section for supporting a slider and a frame that defines an aperture located between the first section and the slider mounting section and openings adjacent the slider mounting section, wherein the conductive leads terminate in terminal pads at one end adjacent the slider mounting section and which terminal pads are located over the openings such that the solder pads can be connected to terminals on a slider supported on the slider mounting section by solder ball bonding; and
forming a limiter extending from the load beam out of the plane of the load beam through the aperture, wherein the slider mounting section extends into the aperture in a direction towards the first section, terminating in an end that interacts with the limiter.

* * * * *